United States Patent
Goto et al.

(10) Patent No.: US 8,155,495 B2
(45) Date of Patent: Apr. 10, 2012

(54) ASSEMBLY OF OPTICAL FIBER AND OPTICAL FIBER HOLDER WITH END PORTION OF OPTICAL FIBER HOUSED IN RECESS

(75) Inventors: Masanori Goto, Hong Kong (CN); Masahiro Onishi, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 149 days.

(21) Appl. No.: 12/656,367

(22) Filed: Jan. 27, 2010

(65) Prior Publication Data

US 2011/0182559 A1  Jul. 28, 2011

(51) Int. Cl.
*G02B 6/00* (2006.01)
*G02B 6/30* (2006.01)

(52) U.S. Cl. ............... 385/137; 385/49; 385/80; 385/92; 385/93

(58) Field of Classification Search ............... 385/31, 385/49, 51, 53, 65, 80, 92, 93, 94, 136, 137, 385/138

See application file for complete search history.

(56) References Cited

U.S. PATENT DOCUMENTS

| | | | | |
|---|---|---|---|---|
| 5,621,835 A * | 4/1997 | Takahashi et al. | | 385/78 |
| 6,062,740 A * | 5/2000 | Ohtsuka et al. | | 385/81 |
| 6,331,081 B1 * | 12/2001 | Ohtsuka et al. | | 385/85 |
| 6,409,394 B1 * | 6/2002 | Ueda et al. | | 385/80 |
| 2005/0158005 A1 * | 7/2005 | Otsuka et al. | | 385/137 |
| 2011/0182559 A1 * | 7/2011 | Goto et al. | | 385/137 |

FOREIGN PATENT DOCUMENTS

| | | |
|---|---|---|
| JP | 2002-90584 | 3/2002 |
| JP | 2005-172714 | 6/2005 |
| JP | 2006-178105 | 7/2006 |

* cited by examiner

*Primary Examiner* — Brian Healy
(74) *Attorney, Agent, or Firm* — Nixon & Vanderhye PC

(57) ABSTRACT

The present invention is directed to an assembly of an optical fiber and an optical fiber holder for holding the optical fiber, the optical fiber having an end surface formed at an end portion thereof, the end surface being configured to perform light coupling with a light emitting element or with a light receiving element. The optical fiber holder comprises; a throughhole which extends through the optical fiber holder and a recess that is positioned on a surface of the optical fiber holder and that is provided with an opening of the throughhole. The optical fiber is inserted through the throughhole and an adhesive is filled in a gap between an inner wall of the throughhole and an outer periphery of the optical fiber, the adhesive being used for adhering the optical fiber to the optical fiber holder. The end portion, on which is formed the end surface of the optical fiber, protrudes from the opening and terminates within the recess.

2 Claims, 5 Drawing Sheets

ASSEMBLY OF OPTICAL FIBER AND OPTICAL FIBER HOLDER WITH END PORTION OF OPTICAL FIBER HOUSED IN RECESS

BACKGROUND OF THE INVENTION

1. Field of the Invention

The present invention relates to an assembly of an optical fiber and an optical fiber holder.

2. Description of the Related Art

In an optical fiber device, light is emitted from a light emitting element, such as a light emitting diode, and is converged on an end surface of an optical fiber by means of a lens, thereby light coupling is achieved. Also, light is emitted from an end surface of an optical fiber, then transformed into collimated light by means of a lens and is incident on a light receiving element, such as a photo-diode, thereby light coupling is achieved. The optical fiber is held in an optical fiber holder. A lens and a light emitting element (a light receiving element) are mounted in a receptacle. An optical fiber holder is connected to a receptacle such that the lens comes into focus on the end surface of the optical fiber (for example, JP2002-90584A). "The end surface of an optical fiber", used herein, refers to a light exiting surface or a light incident surface of an optical fiber, i.e., a surface at the end portion of an optical fiber that is orthogonal to the direction of the axis of the optical fiber.

FIG. 1 is a cross-sectional view showing an example of a conventional optical fiber holder. Optical fiber 2 is inserted through throughhole 7 of optical fiber holder 1 with its end surface 2b facing lens 5 that is supported by receptacle 3. Optical fiber 2 is adhered to optical fiber holder 1 by the following steps. First, optical fiber 2 is pre-processed (the optical fiber coating is removed and the optical fiber is cut) and pre-processed optical fiber 2 is inserted through throughhole 7 of optical fiber holder 1 such that its end portion 2a protrudes from surface 1b of optical fiber holder 1 that faces receptacle 3. Next, UV (ultraviolet-ray) cure resin 11 is injected into gap 9 that is formed between inserted optical fiber 2 and throughhole 7. UV cure resin 11 spreads in gap 9 due to the capillarity phenomenon and fills gap 9. Then, resin 11 is irradiated with ultraviolet rays so as to be cured, thereby optical fiber 2 is adhered to optical fiber holder 1.

The reason why end portion 2a of optical fiber 2 protrudes from surface 1b of optical fiber holder 1 is as follows. UV cure resin 11 instantaneously reaches end portion 2a of optical fiber 2 due to the capillarity phenomenon. If end surface 2b of optical fiber 2 aligns with surface 1b of optical fiber holder 1, the resin that reaches end portion 2a of optical fiber 2 will spread onto end surface 2b of optical fiber 2, preventing light from passing through end surface 2b. This may cause the performance of an optical fiber device to deteriorate. Removing the resin sticking to end surface 2b requires a cleaning process. A similar phenomenon occurs when end surface 2b of optical fiber 2 is positioned inside throughhole 7 of optical fiber holder 1. In this case, it is quite difficult to completely remove the resin sticking to end surface 2b. In contrast, when end surface 2b of optical fiber 2 protrudes from surface 1b of optical fiber holder 1 that faces receptacle 3, the resin, after reaching surface 1b of optical fiber holder 1 due to the capillarity phenomenon, not only spreads along optical fiber 2 but also spreads on surface 1b of optical fiber holder 1 because no capillarity works ahead of surface 1b. The resin that spreads widely in this manner is less likely to reach end portion 2a of optical fiber 2 and is less likely to stick to the end surface of the optical fiber.

However, when the end portion of an optical fiber protrudes from the surface of an optical fiber holder, the end surface of the optical fiber is easily subject to mechanical shocks from the outside, although the resin is less likely to stick to the end surface of the optical fiber.

SUMMARY OF THE INVENTION

The present invention is directed to an assembly of an optical fiber and an optical fiber holder for holding the optical fiber, the optical fiber having an end surface formed at an end portion thereof, the end surface being configured to perform light coupling with a light emitting element or with a light receiving element. It is an object of the present invention to provide an assembly mentioned above in which an adhesive is less likely to stick to the end surface of the optical fiber and in which the protection of the end surface of the optical fiber is facilitated.

For this purpose, the optical fiber holder comprises; a throughhole which extends through the optical fiber holder and a recess that is positioned on a surface of the optical fiber holder and that is provided with an opening of the throughhole. The optical fiber is inserted through the throughhole and an adhesive is filled in a gap between an inner wall of the throughhole and an outer periphery of the optical fiber, the adhesive being used for adhering the optical fiber to the optical fiber holder. The end portion, on which is formed the end surface of the optical fiber, protrudes from the opening and terminates within the recess.

The optical fiber is disposed such that the end portion thereof protrudes from the opening that is positioned within the recess. Therefore, even if an adhesive is injected in the gap due to the capillarity phenomenon, the capillarity phenomenon stops at the opening of the throughhole, and thereby the adhesive is less likely to stick to the end surface of the optical fiber. Further, since the end portion of the optical fiber terminates within the recess, the optical fiber is less likely to be subject to shocks from the outside. Accordingly, protection of the end surface of the optical fiber is facilitated.

The above and other objects, features, and advantages of the present invention will become apparent from the following description with reference to the accompanying drawings which illustrate the present invention.

DESCRIPTION OF PREFERRED EMBODIMENTS

Figure 1:
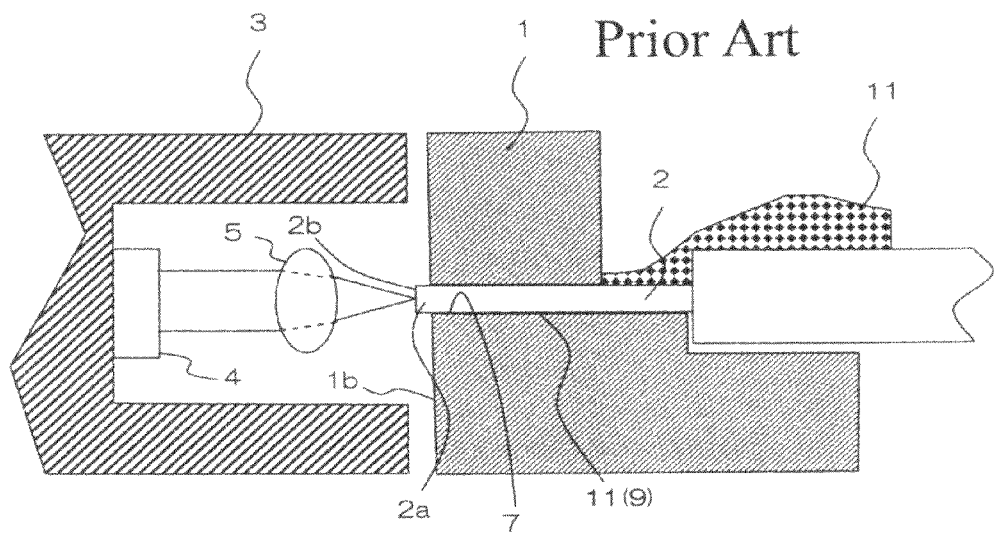
FIG. 1 is a cross-sectional view showing a conventional assembly of an optical fiber and an optical fiber holder.
Figure 2A:
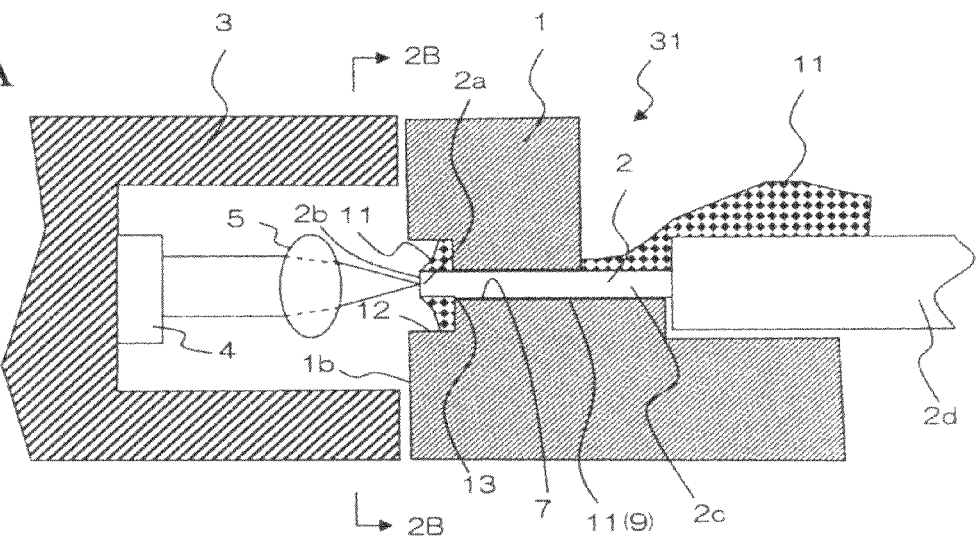
FIG. 2A is a cross-sectional view showing an assembly of an optical fiber and an optical fiber holder according to one embodiment of the present invention.
Figure 2B:
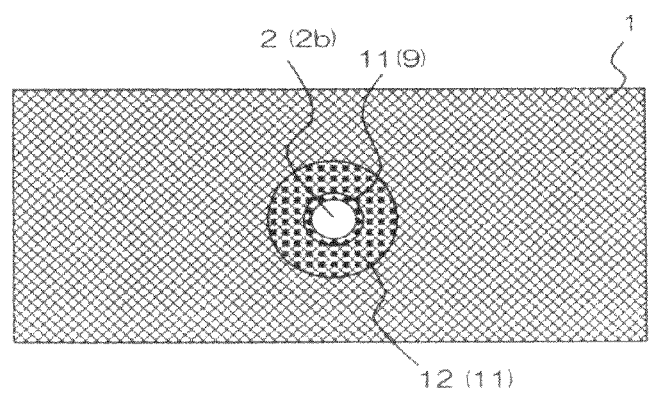
FIG. 2B is a plan view taken along line 2B-2B in FIG. 2A.

In the following, several embodiments of the present invention will be described with reference to the drawings. Referring to FIGS. 2A, 2B, optical fiber holder 1 for holding optical fiber 2 is shown. Optical fiber 2 and optical fiber holder 1 constitutes assembly 31. Optical fiber holder 1 is disposed opposite to receptacle 3. Optical fiber 2 held by optical fiber holder 1 has end surface 2b formed at end portion 2a and end surface 2b is oriented toward receptacle 3. Light emitting element 4 consisting, for example, of a light emitting diode or of a semiconductor laser and lens 5 are mounted on receptacle 3. Light flux emitted from light emitting element 4 is converged by means of lens 5 and is incident on end surface 2b of optical fiber 2.

FIG. 2A shows an example of receptacle 3 on which light emitting element 4 is mounted. However, it is also possible to mount a light receiving element, such as a photo-diode, on receptacle 3. In this case, contrary to FIG. 2A, light emitted from end surface 2b of optical fiber 2 is transformed into collimated light by means of lens 5, and is incident on the light receiving element. In this manner, light coupling is achieved between optical fiber 2 and light emitting element 4 or between optical fiber 2 and a light receiving element.

Optical fiber holder 1 includes throughhole 7 which extends through optical fiber holder 1. Optical fiber 2 is inserted through and adhered to throughhole 7. Throughhole 7 has an inner diameter that is slightly larger than the outer diameter of optical fiber 2 (bare fiber portion 2c) so that gap 9 is formed between the inner wall of throughhole 7 and the outer periphery of optical fiber 2. This gap 9 is filled with UV cure resin 11 (adhesive) to make optical fiber 2 adhere to optical fiber holder 1. The size of gap 9, i.e., the thickness of UV cure resin 11 is dimensioned such that when UV cure resin 11 is injected into gap 9, as described later, UV cure resin 11 spreads through gap 9 due to the capillarity phenomenon. The size of gap 9 is in the range of 1-2 nm in one example.

Optical fiber holder 1 is provided with recess 12 on surface 1b that faces receptacle 3. In this embodiment, recess 12 is substantially cylindrical in shape and is arranged concentrically with throughhole 7. Opening 13 of throughhole 7 on the side that faces receptacle 3 is positioned near the center of recess 12. There is no particular limitation on the shape of recess 12. Besides a cylindrical shape, recess 12 may be formed in a curved shape, such as a circular truncated cone and a hemisphere shape or in a linear shape, such as a rectangular parallelpiped and a cube or in a combination of a curved shape and a linear shape. Additionally, recess 12 can be formed in any shapes, such as a circular, an oval and a rectangular shape, when seen in the plan view. However, the shape and dimension of recess 12 are preferably selected such that no capillarity phenomenon occurs between the surface of recess 12 and the surface of optical fiber 2.

End portion 2a of optical fiber 2 having end surface 2b formed thereon protrudes from opening 13 of throughhole 7. Further, end portion 2a terminates within recess 12. Specifically, end portion 2a is positioned on a virtual plane that includes surface 1b of optical fiber holder 1 or is positioned at the side that is closer to opening 13 of throughhole 7 than the virtual plane. End surface 2b of optical fiber 2 may be subject to mechanical shocks from the outside during transportation of optical fiber 2 or during the operation for attaching optical fiber holder 1 to receptacle 3. However, end surface 2b of optical fiber 2, which is housed within recess 12 in this way, is less likely to be subject to shocks from the outside.

In order to adhere optical fiber 2 to optical fiber holder 1, pre-processing of optical fiber 2 is performed first, which consists of removing the coating from optical fiber 2 and cutting optical fiber 2 (formation of the end surface). Optical fiber 2 can be cut either by means of a mechanical method using an ordinary cutter or by means of laser cutting. The laser cutting, which uses heat for cutting, is less likely to cause cracks and chips on the optical fiber than mechanical cutting. Accordingly, laser cutting provides a higher yield without requiring a lapping process after cutting. Additionally, laser cutting enables the end surface of the optical fiber to be formed with higher positional accuracy. When a mechanical method is employed, it is desirable to conduct an appearance test of end surface 2b after cutting in order to confirm whether or not optical fiber 2 has cracks or chips and to use only optical fibers 2 that are free from cracks and chips in the subsequent processes.

Figure 3A:
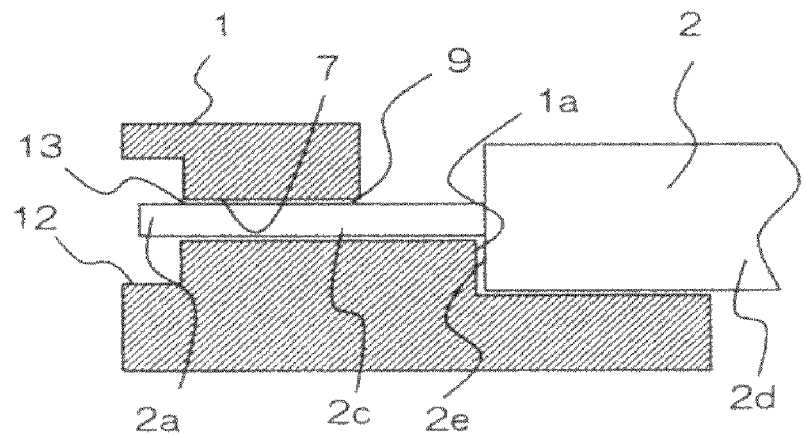
FIGS. 3A-3C are diagrams generally showing steps for producing the assembly shown in FIGS. 2A, 2B.

Next, as shown in FIG. 3A, optical fiber 2 is inserted through throughhole 7 such that end portion 2a of optical fiber 2 protrudes from opening 13 of throughhole 7 and terminates within recess 12. Slight gap 9 is formed between throughhole 7 and optical fiber 2. Bare fiber portion 2c, which is formed by removing the coating, is formed longer than the length of throughhole, and shoulder 2e is formed at the boundary with coating 2d of optical fiber 2. Optical fiber holder 1 is also provided with shoulder 1a. Thus, when optical fiber holder 1 is inserted as far as a predetermined position, shoulder 2e of optical fiber 2 abuts with shoulder 1a of optical fiber holder 1, thereby rapid and rough positioning of optical fiber 2 can be performed.

Figure 3B:
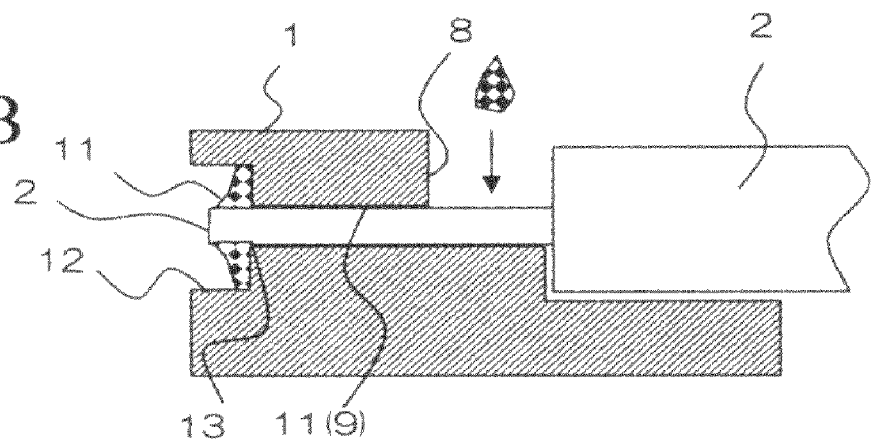

In this state, optical fiber 2 is temporarily adhered to optical fiber holder 1. Next, as shown in FIG. 3B, UV cure resin 11 is injected from resin injection port 8 of optical fiber holder 1. A resin may be applied in advance near resin injection port 8 of optical fiber 2 and a spot cure may be used to temporarily adhere optical fiber 2 to optical fiber holder 1. Besides functioning as a port for injecting resin 11, resin injection port 8 is used for final positioning of optical fiber 2 in the axial direction. Injected resin 11 spreads in gap 9 between throughhole 7 and optical fiber 2 due to the capillarity phenomenon and fills gap 9. Resin 11 reaches the vicinity of opening 13 of throughhole 7. However, since no capillarity phenomenon occurs ahead of opening 13, i.e., in the space of recess 12, resin 11 that overflows from opening 13 flows along the surface of optical fiber 2 and on the surface of recess 12, building up on the bottom of recess 12. Resin 11 that builds up on the bottom of recess 12 seals opening 13 of throughhole 7, protecting bare fiber portion 2c. By appropriately selecting the amount of resin 11, resin 11 does not reach end portion 2a of optical fiber 2 and is thereby prevented from sticking to end surface 2b.

In this process, resin 11 is used in order to adhere bare fiber portion 2c to resin injection port 8 and to throughhole 7 and in order to seal throughhole 7 from both sides. Accordingly, a minimal amount of resin 11 is preferably injected for this purpose. Gap 9 may be completely filled with resin 11 or may be partially filled with resin 11 as long as the above purpose is achieved. If excessive resin 11 is injected, then resin 11 which spreads in gap 9 and reaches opening 13 of throughhole 7 will be more likely to fill recess 12 and to reach end portion 2a of optical fiber 2. Subsequently, resin 11 is irradiated with ultraviolet rays so as to be cured.

Figure 3C:
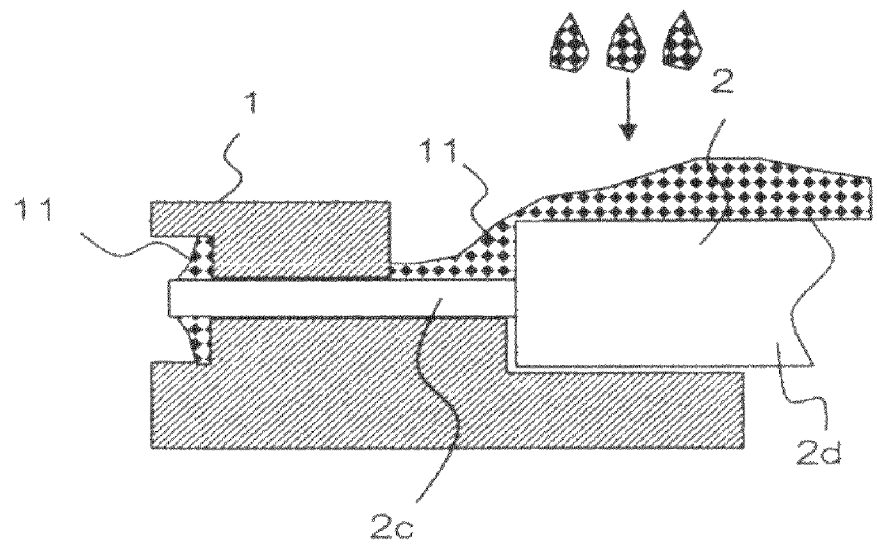

Next, as shown in FIG. 3C, a sufficient amount of resin 11 is applied over bare fiber portion 2c and coating 2d in order to seal bare fiber portion 2c and to securely adhere optical fiber 2 to optical fiber holder 1. Since resin 11 within throughhole 7 is already cured, even if a large amount of resin 11 is applied, resin 11 does not flow into throughhole 7 or into recess 12.

Figure 4A:
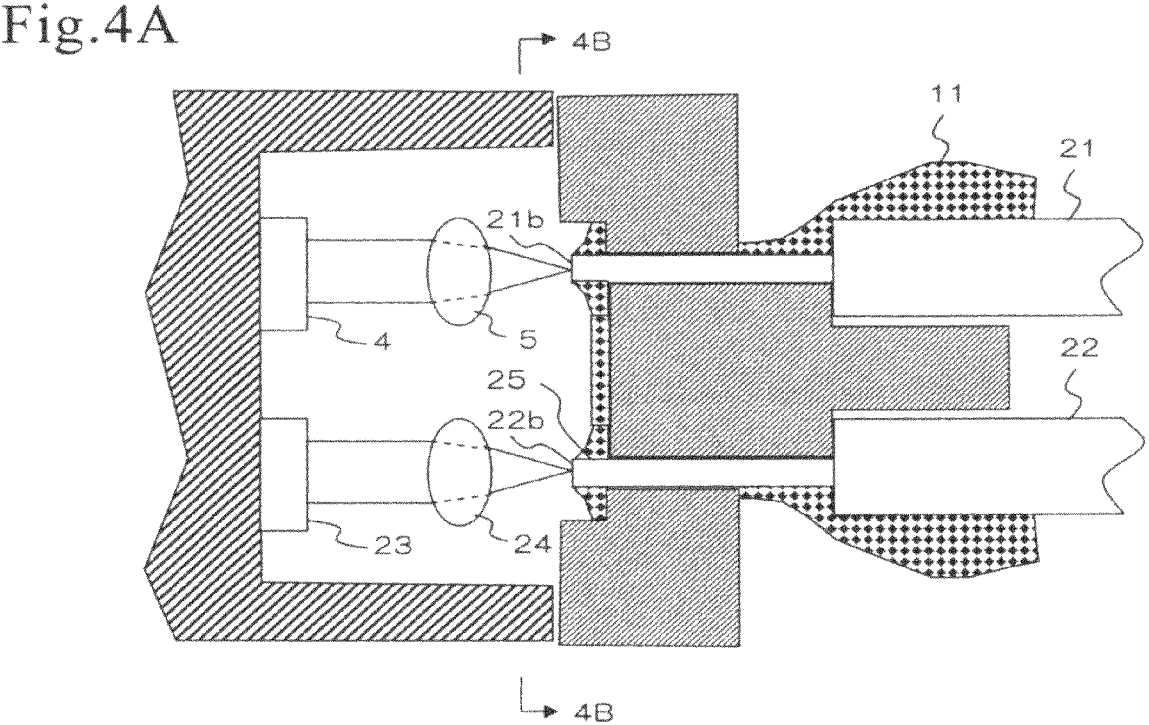
FIG. 4A is a cross-sectional view showing another embodiment of the present invention.
Figure 4B:
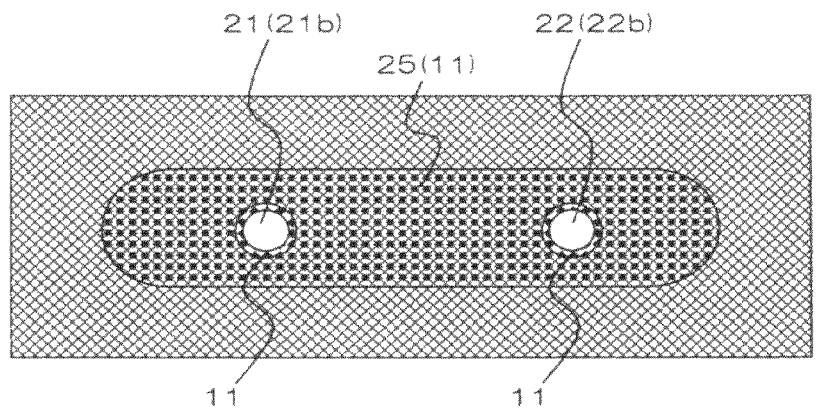
FIG. 4B is a plan view taken along line 4B-4B in FIG. 4A.

Next, another embodiment of the present invention will be described. First, the recess may accommodate a plurality of optical fibers. FIGS. 4A, 4B are diagrams that are similar to FIGS. 2A, 2B, illustrating an embodiment in which two optical fibers 21, 22 are disposed in a single recess. Receptacle 3 has light emitting element 4, lens 5 associated therewith, light receiving element 23 and lens 24 associated therewith. Light flux emitted from light emitting element 4 is converged by means of lens 5 and is incident on end surface 21b of optical fiber 21. Light flux exiting from end surface 22b of optical fiber 22 is transformed into collimated light by means of lens 24 and is incident on light receiving element 23.

Recess 25 has an elongated shape in which both ends have a semi-circular end and the central area has a rectangular shape, when seen in a plan view, and has a constant depth. There is no particular limitation on the shape of recess 25. Recess 25 may be formed in any shape, such as a circular, an oval or a rectangular shape, when seen in the plan view. The depth of recess 25 may be constant or may continuously or discontinuously increase toward the center or toward the throughholes. Also in this embodiment, resin 11 builds up on the bottom of recess 25 and is less likely to stick to end surfaces 21b, 22b of the optical fibers. Further, since end surfaces 21b, 22b are housed within recess 25, they are less likely to be subject to mechanical shocks from the outside.

FIG. 5 shows an embodiment in which the recess is formed in the form of a groove. In the above-mentioned embodiments, recesses 12, 25 are formed inside of a closed line on surface 1b of optical fiber holder 1. On the other hand, recess 26 in this embodiment is groove 26 which extends through surface 1b that faces receptacle 3 of optical fiber holder 1. Both ends of the center line of groove 26 are located on two different points on the periphery of surface 1b. Groove 26 may extend linearly on surface 1b of optical fiber holder 1 in any direction.

Providing such a groove can streamline the manufacturing process. FIGS. 6A-6D are diagrams generally showing part of the steps for manufacturing the assembly according to this embodiment. The processes shown in FIGS. 6A-6C are basically the same as the processes shown in FIGS. 3A-3C. However, end portion 2a of optical fiber 2 can be located at any position and no adjustment for positioning end portion 2a is required. The pre-processing of optical fiber 2 only requires removing the coating of optical fiber 2. In FIGS. 6A-6C, optical fiber 2 extends as far as the outside of groove 26, but may remain within groove 26. After covering optical fiber 2, including coating 2d, with resin 11, as shown in FIG. 6C, laser light R is irradiated in the direction in which groove 26 extends (direction in which groove 26 extends through optical fiber holder 1), i.e., a direction that is orthogonal to the drawing in FIG. 6D or in the direction indicated by arrow D in FIG. 5B, in order to form end surface 2b of optical fiber 2. Laser light R is incident from one opening of groove 26 and exits to the outside of groove 26 from the other opening of groove 26 after cutting optical fiber 2. Also in this embodiment, resin 11 builds up on the bottom of recess 26 and is less likely to stick to end surfaces 2b of the optical fiber 2. Further, since end surface 2b are housed within recess 26, end surface 2b is less likely to be subject to mechanical shocks from the outside.

Figure 5A:
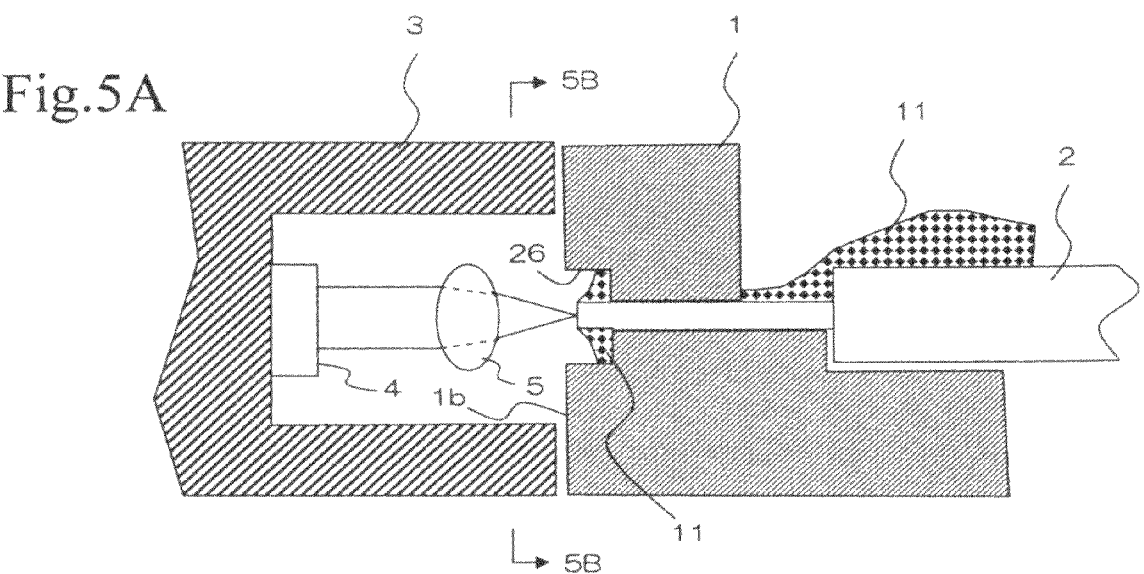
FIG. 5A is a cross-sectional view showing another embodiment of the present invention.
Figure 5B:
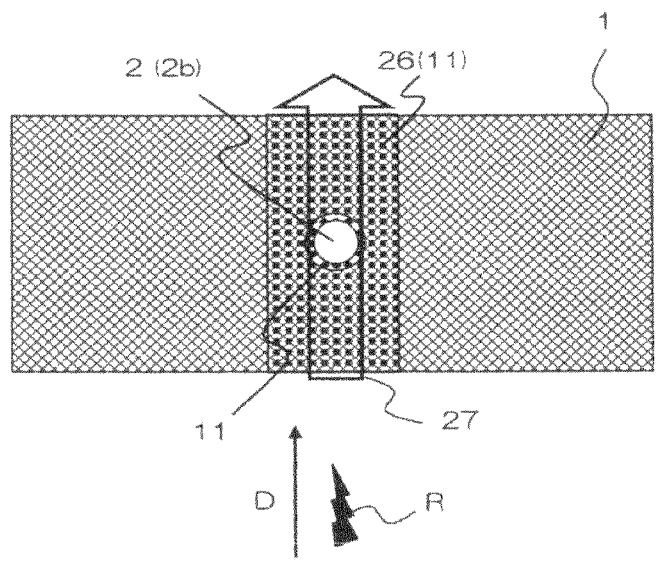
FIG. 5B is a plan view taken along line 5B-5B in FIG. 5A.
Figure 6A:
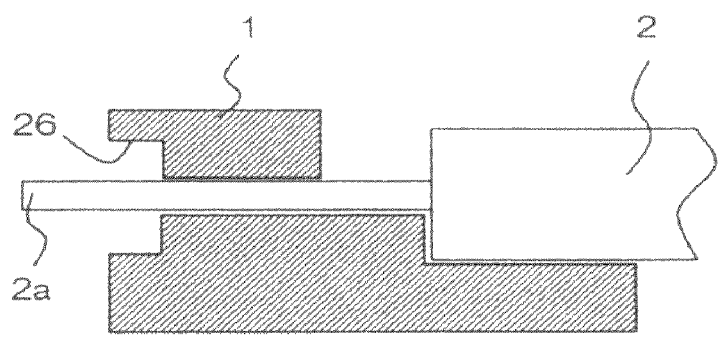
FIGS. 6A-6D are diagrams generally showing steps for producing the assembly shown in FIGS. 5A, 5B.
Figure 6B:
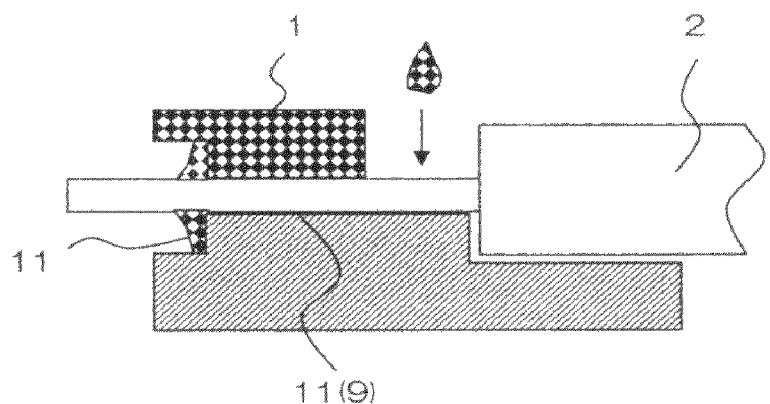
Figure 6C:
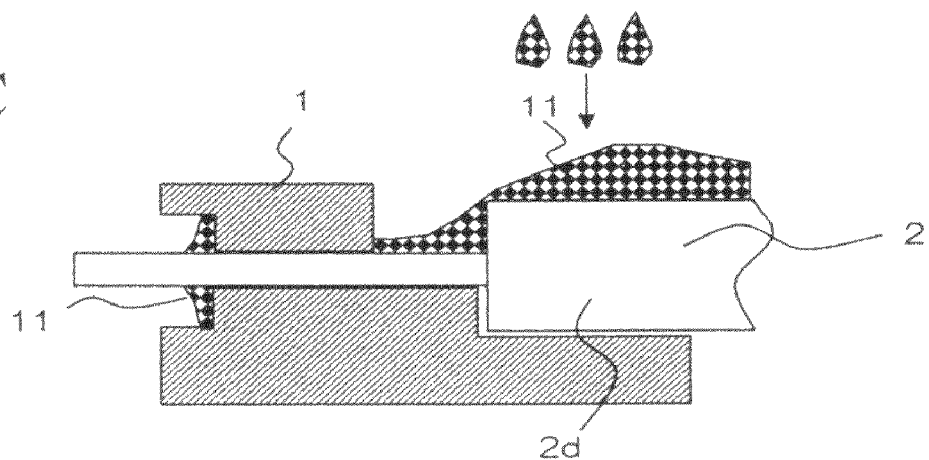
Figure 6D:
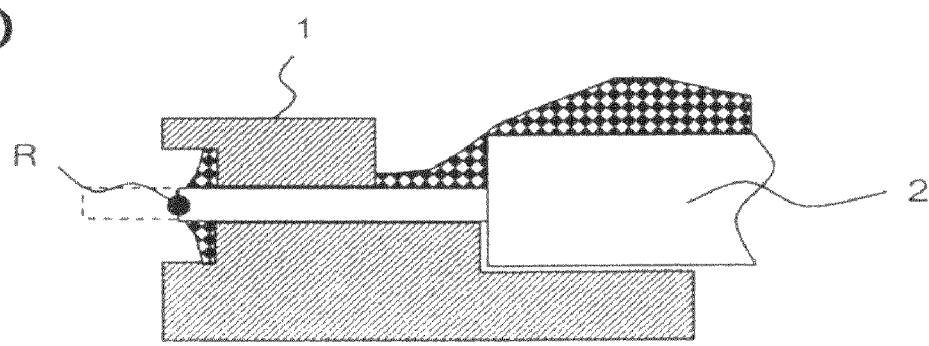

Groove 26 is not limited to a linear shape having a constant width and a constant depth, as shown in FIGS. 5A, 5B, because laser light R is only required to pass through groove 26 without impinging on optical fiber holder 1 after entering groove 26. In other words, the shape of groove 26 is not limited as long as the presence of linear path 27, that allows laser light R to pass through, is ensured in groove 26. While a linear shape having a constant width and a constant depth is advantageous for productivity, groove 26 may vary in width or in depth or may be in a curved shape. Groove 26 is only required to extend across surface 1b of optical fiber holder 1 and to include therein linear path 27 which extends between both ends of groove 26 (the incident end and the emitting end for laser light R).

Example

Recess 12 was formed around opening 13 of throughhole 7 through which optical fiber 2 is inserted. Recess 12 has a diameter of approximately 300 μm and a depth of approximately 200 μm. After pre-processing (removing the coating and cutting optical fiber 2), optical fiber 2 was inserted through throughhole 7 and the position of end surface 2b of optical fiber 2 was adjusted by means of a positioning jig. End surface 2b of optical fiber 2 was positioned at one-half of the depth of recess 12, approximately 100 μm apart from surface 1b of optical fiber holder 1 (FIG. 3A). After temporarily fixing the position of optical fiber 2 by means of a clamp, a trace of UV cure resin 11 was applied to bare fiber portion 2c and this trace was cured by spot curing. Throughhole 7 was sealed by making UV cure resin 11 flow in throughhole 7 due to the capillarity phenomenon and then by curing UV cure resin 11. Resin 11 flowed into part of recess 12 and was cured (FIG. 3B). Subsequently, resin 11 was applied over entire optical fiber 2 so that optical fiber 2 was adhered to optical fiber holder 1 (FIG. 3C). Ultraviolet rays and heat were used in order to cure resin 11. An appearance test using a microscope having a magnification of about ×200, as well as a measurement test of light coupling loss was conducted on a sample. As a result, an optical fiber having an end surface housed in the recess with no resin sticking thereto could be easily obtained.

While preferred embodiments of the present invention have been presented and described in detail, it should be understood that various alternations and modifications can be made thereto without departing from the spirit and scope of the appended claims.

What is claimed is:

1. An assembly of an optical fiber and an optical fiber holder for holding the optical fiber, said optical fiber having an end surface formed at an end portion thereof, said end surface being configured to perform light coupling with a light emitting element or with a light receiving element mounted on a receptacle, wherein:
    said optical fiber holder comprises:
        a throughhole which extends through said optical fiber holder, and
        a recess that is positioned on a surface of said optical fiber holder, the surface facing the receptacle, wherein a bottom of the recess faces the receptacle and is provided with an opening of said throughhole, and wherein
    said optical fiber is inserted through said throughhole and an adhesive is filled in a gap between an inner wall of said throughhole and an outer periphery of said optical fiber, said adhesive being used for adhering said optical fiber to said optical fiber holder, and wherein said end portion, on which is formed said end surface of said optical fiber, protrudes from said opening and terminates within said recess.

2. The assembly according to claim 1, wherein said recess is a groove that is provided across said surface of said optical fiber holder, said groove including a linear path therein, said linear path extending between both ends of said groove.

* * * * *